March 15, 1938.  W. H. MALUEG  2,111,247
CURD AGITATOR
Filed Nov. 5, 1936  3 Sheets-Sheet 2
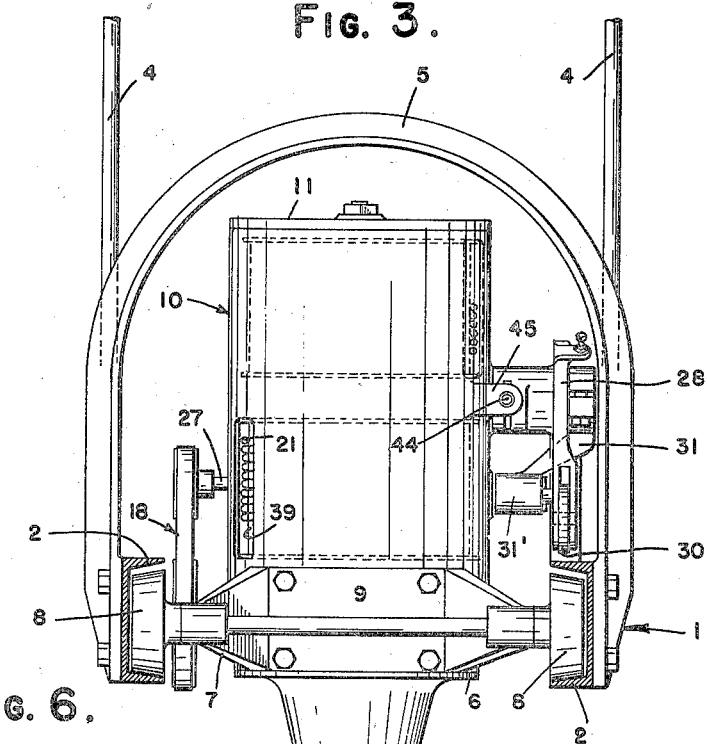
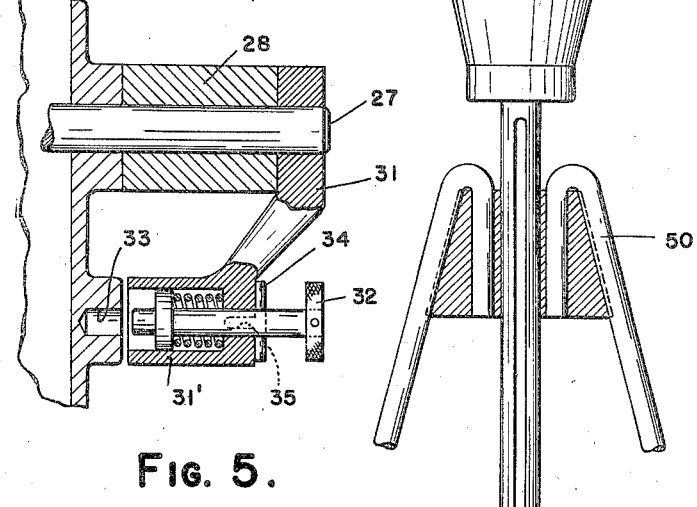
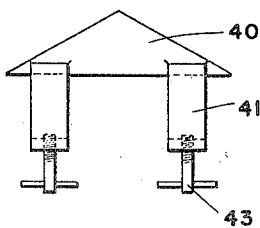
INVENTOR
WM. H. MALUEG
BY
ATTORNEYS

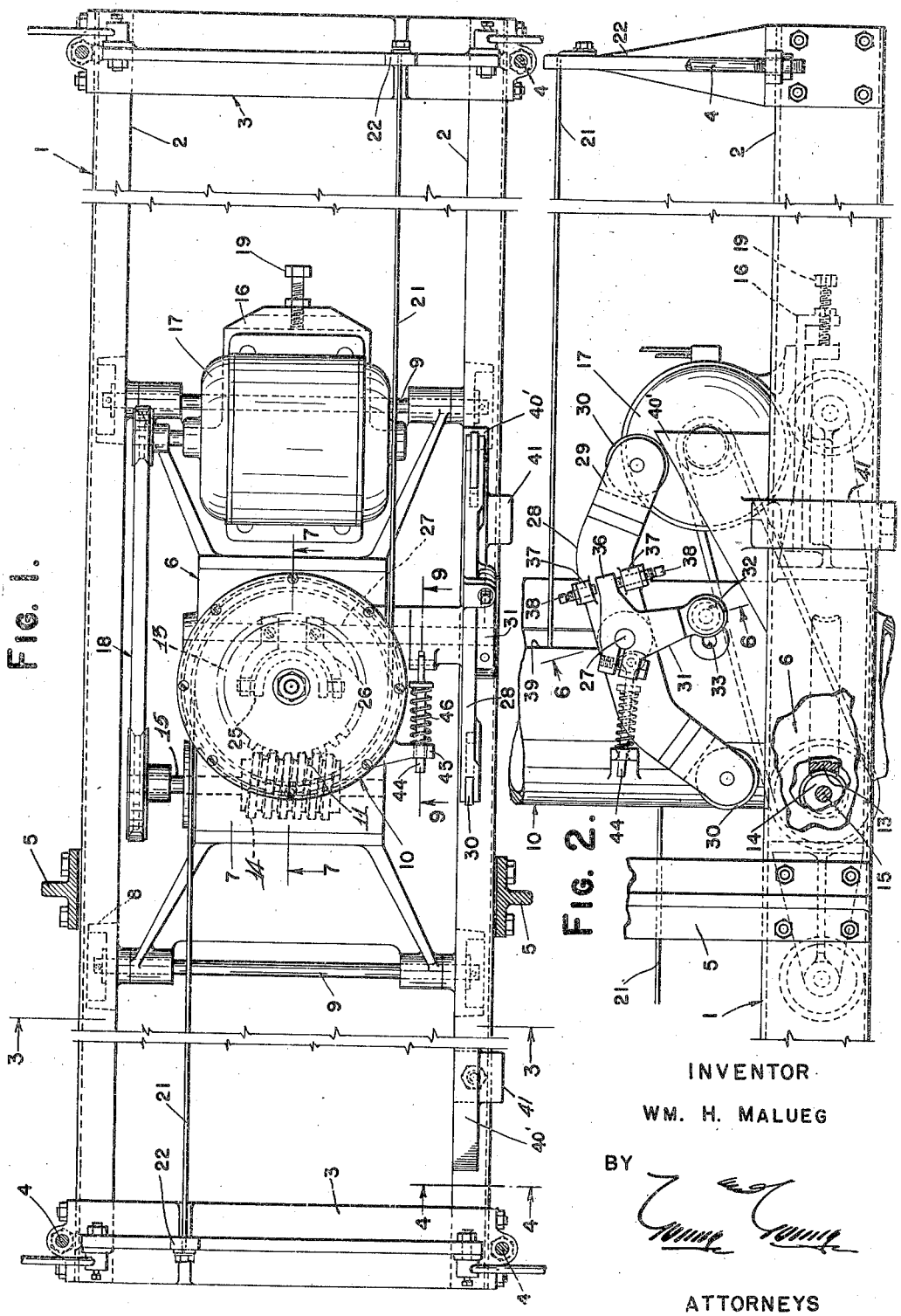

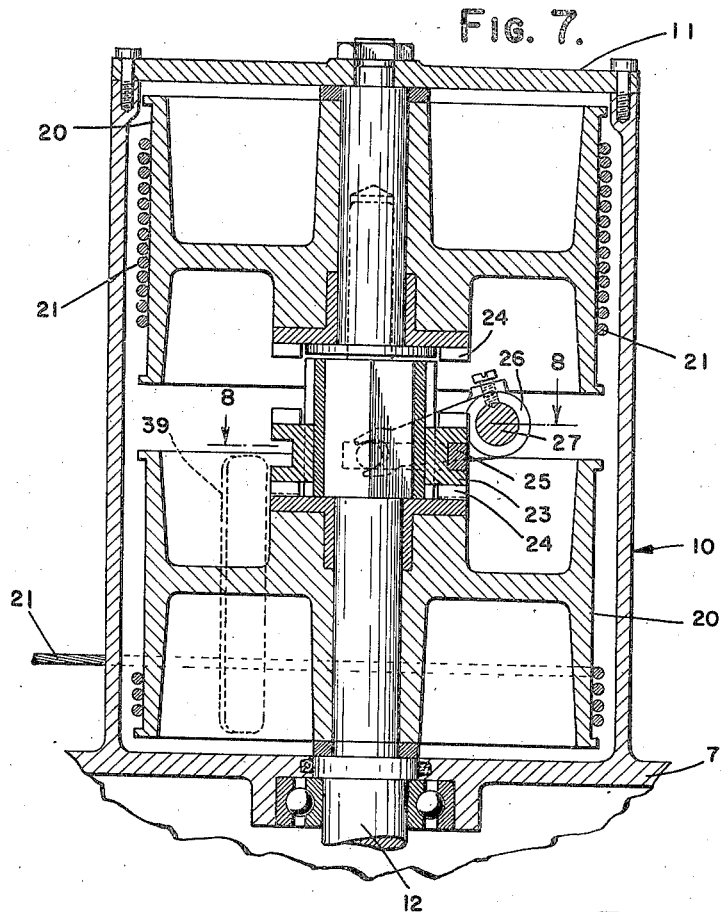
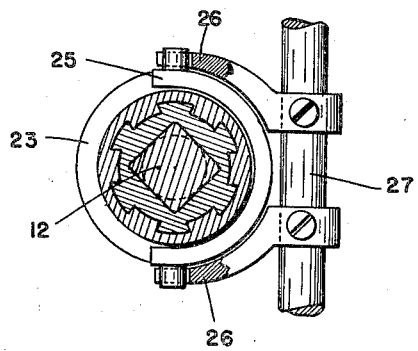
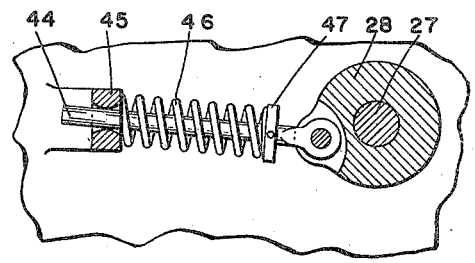
INVENTOR
WM. H. MALUEG
BY
ATTORNEYS

Patented Mar. 15, 1938

2,111,247

UNITED STATES PATENT OFFICE 2,111,247

CURD AGITATOR

William H. Malueg, Clintonville, Wis., assignor to Damrow Brothers Company, Fond du Lac, Wis., a corporation of Wisconsin Application November 5, 1936, Serial No. 109,279

2 Claims. (Cl. 74—23)

This invention pertains to curd agitators and forkers employed in the process of manufacturing cheese.

The invention has primarily for its object the provision of an improved apparatus of the foregoing character, in which the agitator carriage is reciprocated over the curd vat by means of anchored cables, each wound oppositely over a drum loosely mounted upon a driven shaft and selectively locked to the same to impart movement of the carriage in opposite directions. The driven shaft is operated by an electric motor mounted upon the carriage, and the agitator or forker is secured upon the lower end of the shaft.

A further object of the invention resides in the provision of adjustable trips for controlling the length and direction of travel of the carriage.

A more specific object of the invention resides in housing the transmission and propelling mechanism carried by the carriage, as well as providing novel means for reversing the direction of travel of the carriage upon its track.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Figure 1 is a plan view of a curd agitator embodying the preferred form of the present invention.

Figure 2 is a fragmentary elevation, with parts broken away and in section to more clearly illustrate structural details.

Figure 3 is a transverse section taken on the line 3—3 of Figure 1.

Figure 4 is a detail section taken on the line 4—4 of Figure 1, and illustrating a trip attached to one of the track rails.

Figure 5 is an elevation of a modified form of trip utilized intermediate the end trips, when desired.

Figure 6 is an enlarged fragmentary section taken on the line 6—6 of Figure 2.

Figure 7 is a detail section taken on the line 7—7 of Figure 1.

Figure 8 is a detail section taken on the line 8—8 of Figure 7.

Figure 9 is a detail section taken on the line 9—9 of Figure 1.

Heretofore, in conventional curd agitators reciprocative movement of the agitator carriage has been obtained in various ways, such as by means of an endless chain connected to the carriage, or a rack-and-gear connection between the carriage and track.

Both of the foregoing structures are objectionable in that they require considerable lubrication, and due to the fact that the agitating mechanism is mounted above the curd vat, it frequently occurs that lubricant drips into the contents of the vat.

Furthermore, when an endless chain is employed for actuating the carriage, it has been customary to drive the same continuously in one direction, and, therefore, in order to obtain reverse travel of the carriage, it is necessary for the carriage to travel the entire distance of the track.

The present invention, which is designed to overcome the foregoing objections, comprises a track designated generally by the numeral 1, and comprising longitudinal spaced channel rails 2, connected at their ends by transverse brackets 3, to which suitable guy rods 4 are attached for suspending the track from a ceiling. Intermediate its ends the tracks may be further connected by yokes 5, thus providing an exceptionally rigid and sturdy structure.

Mounted upon the track 1 is a carriage 6, comprising a frame 7 supported at its opposite ends by rollers 8 secured upon the axles 9, suitably journaled in the frame. As best shown in Figure 3, the rollers 8 ride within the channels of the rails 2.

The frame 7 is provided with an upwardly projecting housing 10, provided with a top closure 11, and journaled in the frame and closure is a vertical driven shaft 12 having secured thereon a worm gear 13, meshing with a worm 14 mounted upon a transverse shaft 15, also journaled in the frame 7.

Slidably mounted on one end of the frame 7 is a plate 16, upon which an electric motor 17 is secured. A belt-and-pulley connection 18 between the motor and transverse shaft 15 serves to drive the vertical shaft 12 through the worm gear connection heretofore described. Adjustment of the plate 16, by means of the set screw 19, provides for maintaining desired tension upon the belt drive 18.

Loosely mounted upon the upper end of the driven shaft 12 within the housing 10, is a pair of drums 20, each having wound thereon in opposite directions, a flexible cable 21, the outer end of which is anchored to an upright 22 carried by one of the transverse end braces 3. Keyed upon the shaft 12 and disposed between the drums 20 is a double-faced tooth clutch 23, which selectively engages the teeth 24 formed on the hubs of the drums 20, to lock the drums to the shaft 12. In the intermediate position of the clutch, obviously, no drive will be imparted to either of the drums, and, therefore, the carriage will remain stationary.

Due to the fact that the cables 21 are wound oppositely upon adjacent drums, naturally as the drums are respectively locked to the driven shaft 12, through the clutch 23, movement will be imparted to the carriage in opposite directions.

To render the reciprocative travel of the carriage automatic, the clutch 23 is provided with a spanner ring 25, which is engaged by spanner arms 26 secured upon a transverse rocker shaft 27, journaled in the housing 10, intermediate the drums 20. One end of the rocker shaft 27 projects transversely beyond the carriage, and has a rocker arm 28 secured thereto, and provided with forked ends 29 for reception of rollers 30. In the path of travel of the rollers, one of the side rails 2 has adjustably mounted thereon suitable trips 40' in the form of inclined cams, which, when engaged by the rollers 30, will rock the arm 28, and through the spanner connection shift the toothed clutch 23 to release one of the drums, and lock the other upon the driven shaft 12, thus causing the direction of travel of the carriage to be reversed.

In addition to the rocker 28, an arm 31 is also secured upon the outer end of the rocker shaft 27 and provided with a barrel 31' at its outer end, in which a spring-urged plunger 32 is mounted for engaging a recess 33 formed in the housing 10, to lock the rocker arm in neutral position, in which the clutch 23 is disengaged from both of the drums 20. A pin 34, as best shown in Figure 6, normally serves to hold the plunger 32 out of locking engagement with the housing, and upon rotation of the plunger by means of its knurled head, the pin 34 drops into slots 35 formed in the barrel 31', permitting the end of the plunger to drop into the recess 33. The arm 31 is provided with a tail 36 disposed between lugs 37 carried by the rocker arm 29, and provided with set screws 38 for engaging the tail 36 to adjust the relative position of the rocker arm 29 and the locking arm 31.

As best shown in Figure 3, the cylindrical housing 10 is provided with spaced vertical openings 39, through which the stretches of cables from the drums to their respective anchors extend.

In some instances it is desirable to limit the travel of the carriage on the track 1 at a point intermediate its ends, and, therefore, a two-faced trip cam 40, as best shown in Figure 5, is provided, which can be set at any predetermined intermediate point on the track to confine the travel of the carriage. Both the cam trips 40' and 40 are provided with depending arms 41 adapted to abut the outer face of one of the channel rails 2, and terminating in a foot 42, which carries a set screw 43 for engaging the lower face of the channel to lock the cam trips in their adjusted or set positions.

To hold the rocker shaft 27 in either one of its tripped positions, a pin 44 is pivotally connected between the ears 45 formed on the hub of the rocker arm 28. The pin extends through a lug 45 projecting from the housing 10, and a coil spring 46 mounted on the pin between the lug 45 and a washer 47 secured upon the pin, serves to normally urge the pin past center with reference to the rocker shaft 27, thus securely holding the shaft in either one of its operative positions.

Secured upon the lower end of the vertical driven shaft 12 is a conventional agitator or forker 50, which travels back and forth through the milk or curd as it rotates to both mix and aerate the same.

From the foregoing explanation considered in connection with the accompanying drawings, it will be apparent that an exceedingly simple, inexpensive, and efficient curd agitator has been provided, in which the reversing mechanism is entirely housed, and the necessity of exposed lubricated chains and racks is eliminated.

I claim:

1. In a curd agitator, a track, a carriage mounted upon said track for reciprocative travel, a driven shaft journaled in said carriage, a motor mounted on said carriage operatively connected with said shaft for rotating the same, a pair of drums loosely mounted upon said shaft, means for selectively locking said drums to said shaft, a pair of cables each anchored to one end of the track and wound upon one of the drums in opposite direction to the other cable, and means for actuating said locking means at predetermined positions of the carriage on the track.

2. In a curd agitator, a track, a carriage mounted upon said track for reciprocative travel, a driven shaft vertically journaled in said carriage, a motor mounted upon said carriage and having operative connection with said shaft for rotating the same, a pair of drums loosely mounted upon said shaft, a clutch keyed upon said shaft for selective engagement with said drums, a rock shaft for shifting said clutch on said driven shaft, a rocking lever mounted upon one end of said rock shaft, spaced trip members adjustably secured upon said track for engaging and rocking said lever, and a pair of cables each anchored to one end of the track and wound upon one of the drums in opposite direction to the other cable.

WILLIAM H. MALUEG.